United States Patent
Ando (10) Patent No.: US 8,874,270 B2
(45) Date of Patent: Oct. 28, 2014

(54) APPARATUS FOR TAKING OUT BULK STORED ARTICLES BY ROBOT

(71) Applicant: Fanuc Corporation, Yamanashi (JP)

(72) Inventor: Toshiyuki Ando, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 13/947,805

(22) Filed: Jul. 22, 2013

(65) Prior Publication Data

US 2014/0039679 A1 Feb. 6, 2014

(30) Foreign Application Priority Data

Jul. 31, 2012 (JP) .................................. 2012-170009

(51) Int. Cl.
| | | |
|---|---|---|
| *G06F 19/00* | (2011.01) | |
| *G05B 19/04* | (2006.01) | |
| *G05B 19/18* | (2006.01) | |
| *B25J 9/16* | (2006.01) | |

(52) U.S. Cl.
CPC .............. *B25J 9/1697* (2013.01); *Y10S 901/47* (2013.01); *Y10S 901/46* (2013.01)
USPC ........... 700/259; 700/250; 700/251; 700/252; 700/254; 700/258; 901/46; 901/47

(58) Field of Classification Search
CPC ...... B25J 9/1697; B25J 9/023; B25J 15/0266; B07C 5/10; Y10S 901/47; G06T 7/0022; G06T 1/0014; G06T 7/004; G06T 2207/30164; G06T 2207/10016; G06T 7/002; G05B 2219/40053
See application file for complete search history.

(56) References Cited

U.S. PATENT DOCUMENTS

| 4,305,130 | A | * | 12/1981 | Kelley et al. ................... 700/259 |
|---|---|---|---|---|
| 4,402,053 | A | * | 8/1983 | Kelley et al. ................... 700/259 |
| 4,412,293 | A | * | 10/1983 | Kelley et al. ................... 700/259 |
| 4,985,846 | A | * | 1/1991 | Fallon ........................... 382/153 |
| 6,363,173 | B1 | * | 3/2002 | Stentz et al. ................... 382/195 |
| 6,721,444 | B1 | * | 4/2004 | Gu et al. ........................ 382/154 |
| 6,826,452 | B1 | * | 11/2004 | Holland et al. ................ 700/245 |
| 6,898,484 | B2 | * | 5/2005 | Lemelson et al. ............. 700/245 |
| 7,123,992 | B2 | * | 10/2006 | Ban et al. ....................... 700/258 |
| 7,177,459 | B1 | * | 2/2007 | Watanabe et al. .............. 382/151 |

(Continued)

FOREIGN PATENT DOCUMENTS

| JP | 2007313624 A | 12/2007 |
|---|---|---|
| JP | 2011-083882 A | 4/2011 |
| JP | 2012-024903 A | 2/2012 |
| JP | 2013-101045 A | 5/2013 |

*Primary Examiner* — Khoi Tran
*Assistant Examiner* — Bao Long T Nguyen
(74) *Attorney, Agent, or Firm* — Lowe Hauptman & Ham, LLP (57) ABSTRACT

An article take-out apparatus including, acquiring a reference container image including an open end face of a container by imaging operation by an camera, setting an image search region corresponding to a storage space of the container based on the reference container image, setting a reference plane including the open end face of the container, calculating a search region corresponding to the image search region based on a calibration data of the camera stored in advance, converting the search region to a converted search region, taking out 3D points included in the converted search region by projecting a plurality of 3D points measured by the 3D measuring device on the reference plane, and recognizing positions of articles inside the container using the 3D points.

7 Claims, 6 Drawing Sheets

(56) References Cited

U.S. PATENT DOCUMENTS

| | | | | |
|---|---|---|---|---|
| 7,191,035 | B2* | 3/2007 | Okamoto et al. | 700/245 |
| 7,209,803 | B2* | 4/2007 | Okamoto et al. | 700/245 |
| 7,313,464 | B1* | 12/2007 | Perreault et al. | 700/245 |
| 7,474,939 | B2* | 1/2009 | Oda et al. | 700/245 |
| 7,590,468 | B2* | 9/2009 | Watanabe et al. | 700/259 |
| 7,657,346 | B2* | 2/2010 | Ban et al. | 700/262 |
| 7,957,580 | B2* | 6/2011 | Ban et al. | 382/153 |
| 7,957,583 | B2* | 6/2011 | Boca et al. | 382/154 |
| 8,095,237 | B2* | 1/2012 | Habibi et al. | 700/245 |
| 8,295,975 | B2* | 10/2012 | Arimatsu et al. | 700/216 |
| 8,442,304 | B2* | 5/2013 | Marrion et al. | 382/154 |
| 8,447,097 | B2* | 5/2013 | Fujieda et al. | 382/154 |
| 8,498,745 | B2* | 7/2013 | Umetsu | 700/254 |
| 8,559,671 | B2* | 10/2013 | Milanfar et al. | 382/103 |
| 8,559,699 | B2* | 10/2013 | Boca | 382/153 |
| 2007/0213874 | A1* | 9/2007 | Oumi et al. | 700/245 |
| 2007/0274812 | A1 | 11/2007 | Ban et al. | |
| 2007/0282485 | A1* | 12/2007 | Nagatsuka et al. | 700/245 |
| 2008/0152192 | A1* | 6/2008 | Zhu et al. | 382/103 |
| 2008/0181485 | A1* | 7/2008 | Beis et al. | 382/153 |
| 2011/0301744 | A1* | 12/2011 | Ichimaru | 700/214 |
| 2012/0059517 | A1* | 3/2012 | Nomura | 700/259 |
| 2012/0158180 | A1* | 6/2012 | Iio et al. | 700/259 |
| 2013/0006423 | A1* | 1/2013 | Ito et al. | 700/259 |
| 2013/0010070 | A1* | 1/2013 | Tateno et al. | 348/46 |
| 2013/0103179 | A1* | 4/2013 | Miyoshi | 700/112 |
| 2013/0245824 | A1* | 9/2013 | Barajas et al. | 700/253 |

\* cited by examiner

APPARATUS FOR TAKING OUT BULK STORED ARTICLES BY ROBOT

RELATED APPLICATIONS

The present application is based on, and claims priority from, Japanese Application Number 2012-170009, filed Jul. 31, 2012, the disclosure of which is hereby incorporated by reference herein in its entirety.

BACKGROUND OF THE INVENTION

1. Field of the Invention

The present invention relates to an article take-out apparatus which recognizes the positions of articles stored in bulk in a container and takes out the recognized articles by using a robot.

2. Description of the Related Art

In the past, an apparatus taking an image of articles stored in bulk inside a container by a camera and carrying out image processing of the camera image to recognize the positions of the articles is known. For example, the apparatus which is described in Japanese Unexamined Patent Publication No. 2007-313624A (JP2007-313624A) arranges a camera right above a container so that the container as a whole is included in the field, uses the image from this camera to detect articles, and selects an article to be taken out by a manipulator of the robot. The selected article is taken out using a 3D visual sensor which is provided at the hand part of the manipulator.

However, the camera image includes the open end face and inside walls of the container. Therefore, with recognizing articles from the camera image like in the apparatus which is described in JP2007-313624A, differentiation of the open end face or inside walls from the articles is sometimes difficult.

SUMMARY OF THE INVENTION

One aspect of the present invention is an article take-out apparatus including: a 3D measuring device measuring surface positions of a plurality of articles stored in bulk in a storage space of a container, the container having a planar shaped open end face and inside wall parts, the inside wall parts being connected to the open end face and forming the storage space; a camera taking an image of a region including the open end face of the container; a robot having a hand capable of taking out an article from inside the container; an image acquiring unit acquiring an image of the container taken by the camera; an image search region setting unit setting a region on the image corresponding to the storage space as an image search region, based on the image acquired by the image acquiring unit; a reference plane setting unit setting a plane including the open end face of the container as a reference plane; a search region calculating unit calculating a region on the reference plane corresponding to the image search region as a search region, based on calibration data of the camera stored in advance; a projecting unit projecting a plurality of 3D points measured by the 3D measuring device on the reference plane; a judging unit judging whether the plurality of 3D points projected by the projecting unit are included in the search region; a position recognizing unit recognizing a position of an article inside the container by using the 3D points judged by the judging unit to be included in the search region among the plurality of 3D points measured by the 3D measuring device; and a robot controlling unit controlling the robot so as to take out the article, based on the position of the article recognized by the position recognizing unit.

BRIEF DESCRIPTION OF THE DRAWINGS

The object, features, and advantages of the present invention will become clearer from the following description of embodiments given with reference to the attached drawings, in which.

DETAILED DESCRIPTION

Figure 1:
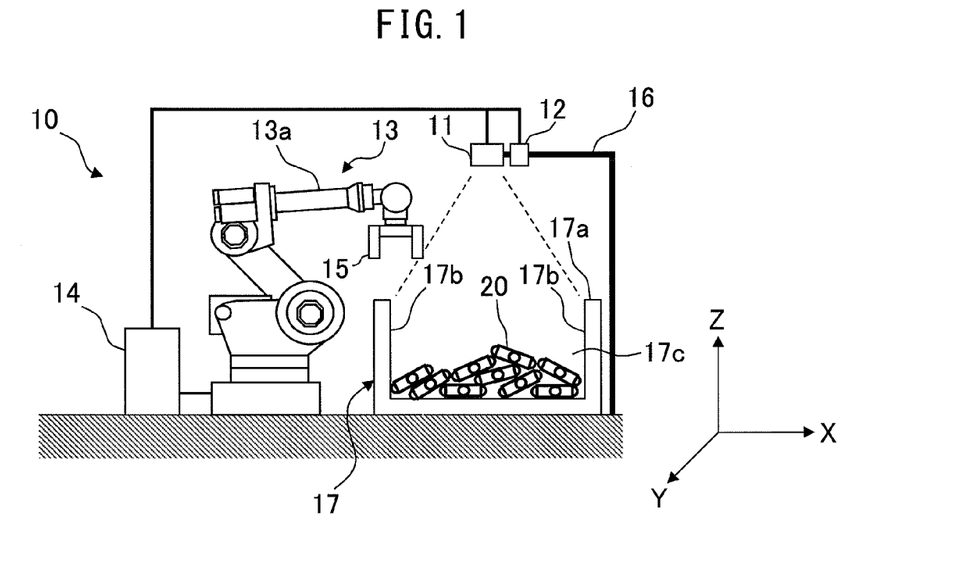
FIG. 1 is a view which shows the schematic configuration of an article take-out apparatus according to an embodiment of the present invention.

FIG. 1 is a view which shows the schematic configuration of an article take-out apparatus 10 according to an embodiment of the present invention. The article take-out apparatus 10 includes a 3D measuring device 11, a camera 12, a robot 13, and a control device 14 which connects the camera 12, 3D measuring device 11, and the robot 13 and controls the 3D measuring device 11, camera 12, and robot 13. The robot 13 has a hand 15 which is attached to a front end of a robot arm 13a. The 3D measuring device 11 and the camera 12 are attached to a frame 16. Below, as illustrated, the mutually perpendicularly intersecting X-axis, Y-axis, and Z-axis are defined. The XY plane which includes the X-axis and Y-axis is a horizontal plane, while the Z-axis is oriented vertically upward.

At the side of the robot 13, a box-shaped container 17 which is opened at the top surface is arranged. The container 17 has a planar shaped open end face 17a (top surface) which is parallel to the bottom surface and inside wall parts 17b which are connected to the open end face 17a and form a storage space 17c. There is a predetermined height Zc from the bottom surface to the open end face 17a. The container 17 is shaped so that the region obtained by projection of the bottom surface and inside wall parts 17b of the container 17 on the plane which includes the open end face 17a along a direction vertical to the plane which includes the open end face 17a matches the closed region which is surrounded by the inside edges of the open end face 17a (portions where the inside wall parts 17b and the open end face of the container intersect). A plurality of articles 20 are stored in bulk the storage space 17c inside the container 17. An article 20 can be gripped by the hand 15. The robot 13 can then be operated to take out the article 20 from the container 17. Above the center part of the container 17, the 3D measuring device 11 and the camera 12 are set.

The 3D measuring device 11, upon command from the control device 14, measures the surface positions of the articles 20 which are stored in bulk inside of the container 17 from above the container 17 so as to acquire a set of 3D points (3D point set). The position and size of the measurement region of the 3D measuring device 11 can be changed in accordance with the position where the 3D measuring device 11 is set. The measurement region of the 3D measuring device 11 is set so as to include the whole of the articles 20 inside the container 17. If the measurement region is too large, a drop in the measurement resolution is invited, so it is preferable to set it to an extent including the region at which the articles 20 may be present, that is, the storage space 17C as a whole. The 3D measuring device 11 and the control device 14 are mutually connected by a communication cable or other communicating portion and can communicate with each other.

For the 3D measuring device 11, various non-contact type devices can be utilized. For example, a stereo system using two cameras, a laser light scanning system, a laser spot scanning system, a system using a projector or other device to project a pattern of light on an article, a system utilizing the travel time of light from being emitted from a projector to being reflected at the surface of an article and entering a light receiver, etc. may be mentioned.

The 3D measuring device 11 expresses the acquired 3D information in the form of a distance image or a 3D map. The "distance image" expresses 3D information by an image format. The brightness and color of the pixels of the image are used to express the height in the Z-direction of the positions corresponding to the pixels or the distance from the 3D measuring device 11. On the other hand, the "3D map" expresses 3D information as a set of the measured 3D coordinate values (x, y, z). In the present embodiment, the pixels at the distance image and the points which have 3D coordinate values at the 3D map are referred to as a "3D points", while the set composed of the plurality of 3D points is referred to as a "3D point set". The 3D point set is the set of the 3D points as a whole measured by the 3D measuring device 11 and can be acquired by the 3D measuring device 11.

The camera 12 is a digital video camera or a digital still camera which has a CCD sensor or CMOS sensor or other imaging element (photoelectric conversion element). Upon command from the control device 14, it takes an image of the region which includes the open end face 17a from above the container 17. The position and size of imaging region of the camera 12 can be changed in accordance with the position at which the camera 12 is set. The imaging region of the camera 12 is set so as to include the whole of the container 17. If the imaging region is too large, a drop in the imaging resolution is invited, so the imaging region is preferably set to an extent including the region in which the container 17 can be present, that is, the open end face 17a as a whole. The camera 12 and the control device 14 are connected with each other by a communication cable or other communicating portion and can communicate with each other.

If the 3D measuring device 11 has a camera and the imaging region of the camera is set to an extent including the region in which the container 17 may be present, the camera which is provided at the 3D measuring device 11 may be used as the camera 12. Due to this, the number of parts becomes smaller and the overall installation space of the 3D measuring device 11 and the camera 12 can be reduced.

Figure 2A:
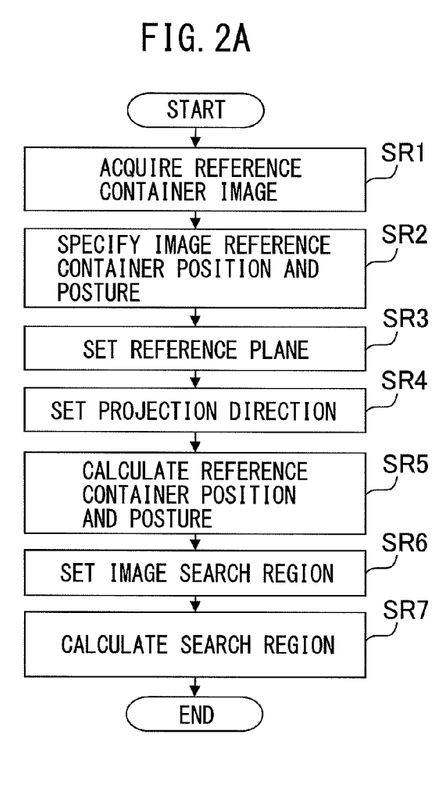
FIG. 2A is a flow chart which shows an example of processing which is executed by a control device of FIG. 1, in particular an example of processing of a stage before article take-out work.
Figure 2B:
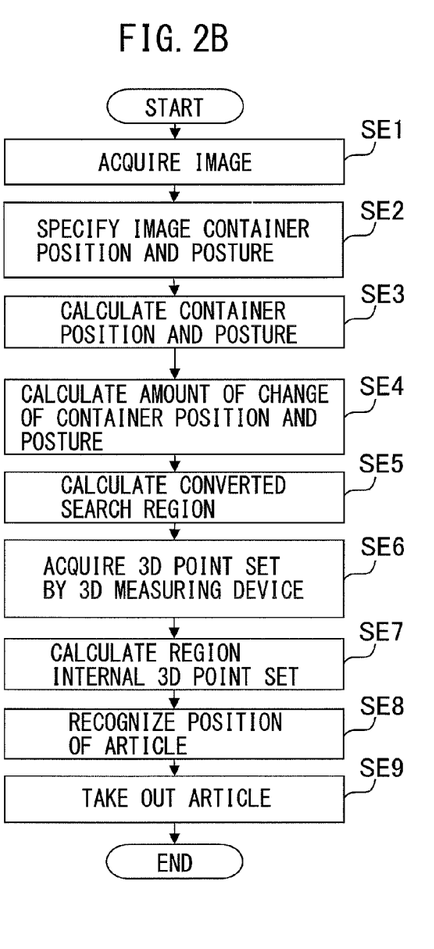
FIG. 2B is a flow chart which shows an example of processing which is executed by a control device of FIG. 1, in particular an example of processing at the time of article take-out work.

The control device 14 is configured including a processing system which has a CPU, ROM, RAM, or other peripheral circuits, etc. FIG. 2A and FIG. 2B are flowcharts which show examples of processing executed at the control device 14. Below, the operation by the article take-out apparatus 10 will be explained with reference to the flow charts of FIG. 2A and FIG. 2B and the related drawings. Before carrying out the processing of FIG. 2A and FIG. 2B, the 3D measuring device 11 and the camera 12 are calibrated with reference to a common coordinate system (XYZ coordinate system).

FIG. 2A shows an example of processing executed in a state where the container 17 is set to a reference position and posture, i.e., a reference state. In the reference state, the container 17 is set on a horizontal floor. The processing of FIG. 2A is processing executed just one time at the time of constructing the bulk storage take-out system. Even when the container 17 changes in position and posture due to a replacement of the container 17, etc., this does not have to be done again. When the size of the container 17 which is used is changed, the search region has to be changed. In that case, the processing of FIG. 2A has to be executed again.

As shown in FIG. 2A, first, at step SR1, in the state where the container 17 is set to the reference state, a control signal is output to the camera 12, the camera 12 takes an image of the region including the container 17, and the taken image is read as a reference container image. That is, the reference container image is acquired.

At step SR2, the position and posture of the open end face 17a of the container 17 on the reference container image is detected as the image reference container position and posture. More specifically, a region which expresses the open end face 17a of the container 17 is specified as the image open end face region IG (FIG. 3) from the reference container image of step SR1. In order to specify the image reference container position and posture (the image open end face region IG), for example, it is possible to use the method of pattern matching, etc. The method of pattern matching is well known, so a detailed description thereof will be omitted.

At step SR3, the plane which includes the open end face 17a of the container 17 in the reference state is set as a reference plane. In the reference state, the container 17 is placed on the horizontal floor (on the XY plane), so the reference plane is also horizontal. That is, the reference plane becomes a horizontal plane with a constant height Zc above the space. In order to set the reference plane, the height Zc is necessary. For the height Zc, it is possible to use a value which is measured in advance or measure it by the 3D measuring device 11.

At step SR4, the direction which intersects the reference plane at a predetermined angle in the reference state is set or calculated as a "projection direction". In the present embodiment, the direction vertical to the reference plane is set as the projection direction. Therefore, the projection direction is parallel to the Z-axis.

At step SR5, the image reference container position and posture, the reference plane, and the calibration data of the camera 12 are used to calculate the position and posture of the container 17 in the actual space corresponding to the image reference container position and posture as the reference container position and posture Cr. That is, the calibration data is used as the basis to calculate at what position and posture on the reference plane the open end face 17a corresponding to the image open end face region IG (FIG. 3) which expresses the image reference container position and posture is. The method of calculating the position and posture Cr of the container 17 in the actual space from the position and posture of the container detected on the image, the reference plane, and the calibration data of the camera 12 is well known. A detailed explanation thereof will be omitted. The calculated reference container position and posture Cr can be expressed by a homogeneous transformation matrix such as in the following formula (I).

$$Cr = \begin{bmatrix} Cr \cdot r_{11} & Cr \cdot r_{12} & 0 & Cr \cdot x \\ Cr \cdot r_{21} & Cr \cdot r_{22} & 0 & Cr \cdot y \\ 0 & 0 & 1 & Zc \\ 0 & 0 & 0 & 1 \end{bmatrix} \quad (I)$$

In the above formula (I), Cr.x and Cr.y express the positions of the container, while Cr.r11, Cr.r12, Cr.r21, and Cr.r22 express the postures of the container. The control device 14 stores this reference container position and posture Cr in the memory.

At step SR6, the inside from the inside walls 17b of the container 17 on the reference container image, that is, the region at the inside of the image open end face region IG, is set as the image search region. The image search region is expressed by a plurality of points Vri (i=1, 2, 3, . . . ) on the image as vertices and surrounded by successively connecting the vertices Vri. Vri can be expressed by the following formula (II). Vri.vt expresses the image position in the vertical direction on the image, while Vri.hz expresses the position in the horizontal direction on the image.

$$Vr_i = \begin{bmatrix} Vr_i \cdot vt \\ Vr_i \cdot hz \end{bmatrix} \quad (II)$$

$(i = 1, 2, 3, \ldots)$

Figure 3:
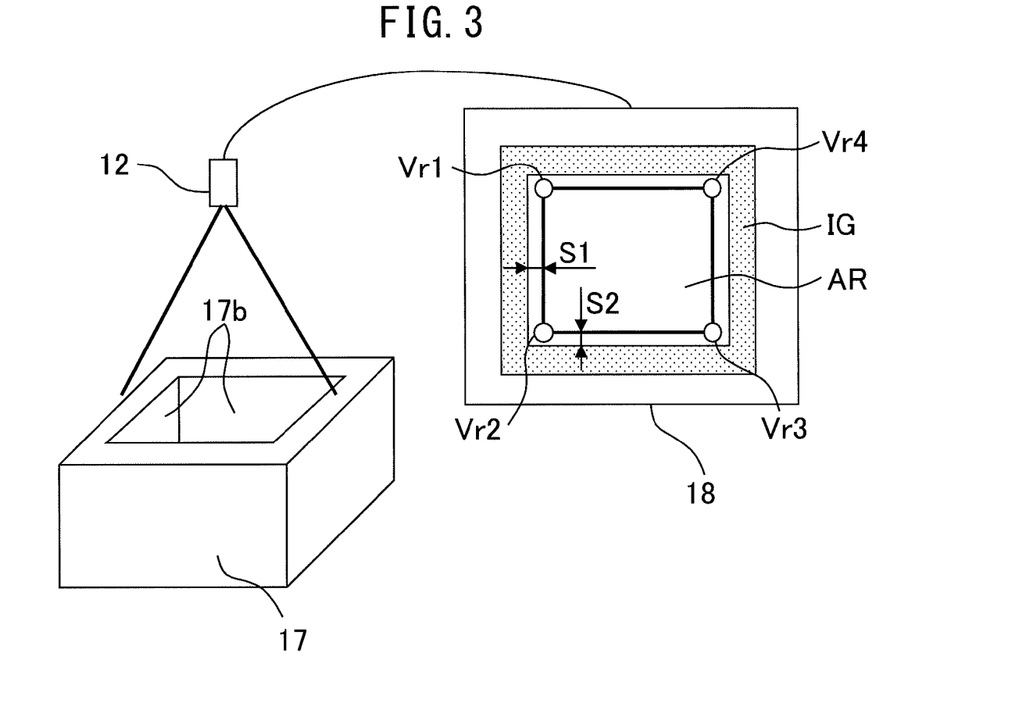
FIG. 3 is a view which schematically shows an example of an image search region which is obtained by the processing of FIG. 2A.

FIG. 3 is a view which shows an example of the image search region AR and schematically expresses the reference container image 18. In FIG. 3, the articles 20 are present at the inside of the inside walls 17b of the container 17. Therefore, for example, the four vertices Vr1 to Vr4 obtained by moving the four points of the corners of the image open end face region IG by predetermined amounts s1, s2 to the inside are set as vertices expressing the image search region AR. Vertices Vr1 to Vr4 are set at the insides from the image open end face region IG by the predetermined amounts s1, s2 so as to prevent mistaken recognition of 3D points on the inside walls of the container 17 as 3D points on articles 20 at the inside from the inside walls 17b of the container 17 due to relief shapes of the inside walls 17b of the container 17 or measurement error of the 3D measuring device 11. The predetermined amounts s1, s2, for example, should be set considering what kind of length on the image the depth of the inside walls 17b is expressed by. Preferably they are set to extents so that the articles 20 near the inside walls 17b of the container 17 do not protrude to the outside of the search region.

At step SR7, the four points Vri (i=1, 2, 3, 4) on the image, the reference plane, and calibration data of the camera 12 are used to calculate and store four points Wri (i=1, 2, 3, 4) on the reference plane at the height Zc in actual space as points expressing the search region. That is, the calibration data of the camera 12 is used as the basis to calculate the region on the reference plane corresponding to the image search region AR as a search region. Wri can be expressed by the following formula (III). Wri.x expresses the x-coordinate in actual space, while Wri.y expresses the y-coordinate in actual space.

$$Wr_i = \begin{bmatrix} Wr_i \cdot x \\ Wr_i \cdot y \\ Zc \end{bmatrix} \quad (III)$$

$(i = 1, 2, 3, 4)$

In the present embodiment, although the search region is obtained by connecting the four points Wri by straight lines, the number of points Wri is not limited to four. The search region can be set with three points or more. The above ends the processing of the stage before the article take-out work which is executed with the container 17 set in the reference state.

FIG. 2B is a flowchart which shows an example of the processing at the time of article take-out work. This processing is executed at the time of the article take-out work after the processing of FIG. 2A.

At step SE1, at the time of article take-out work, the region which includes the container 17 is taken a image by the camera 12 and the image in the actual state (actual container image) is acquired. The position of the container 17 in the actual state is often different from the position of the container 17 in the reference state. However, even in the actual state, the container 17 is set on the same horizontal floor as in the reference state. Therefore, the reference plane which includes the open end face 17a of the container 17 in the reference state becomes the reference plane which includes the open end face 17a of the container 17 even at the time of the article take-out work (actual state).

At step SE2, the position and posture of the open end face 17a of the container on the actual container image which acquired at step SE1 is detected as the image container position and posture (also sometimes referred to as an "image actual container position and posture"). That is, in the same way as at step SR2, pattern matching, etc. can be used to specify the image open end face region from the camera image.

At step SE3, the position and posture of the container 17 in the actual space corresponding to the image container position and posture is calculated as the container position and posture (sometimes also referred to as the "actual container position and posture") Ce from the image container position and posture, the reference plane, and the calibration data. That is, the calibration data is used as the basis to calculate what kind of position and posture on the reference plane the open end face 17a corresponding to the image open end face region which expresses the image container position and posture becomes. For the method of calculation of the position and posture of the container 17 in the actual space, the same method as in step SR5 may be used. The calculated container position and posture Ce can be expressed by the following formula (IV).

$$Ce = \begin{bmatrix} Ce \cdot r_{11} & Ce \cdot r_{12} & 0 & Ce \cdot x \\ Ce \cdot r_{21} & Ce \cdot r_{22} & 0 & Ce \cdot y \\ 0 & 0 & 1 & Zc \\ 0 & 0 & 0 & 1 \end{bmatrix} \quad (IV)$$

At step SE4, the amount of change Cofs of the container position and posture is calculated from the reference container position and posture Cr calculated at step SR5 and the container position and posture Ce calculated at step SE3. The amount of change Cofs of the container position and posture can be calculated by the following formula (V). Inv( ) indicates an inverse matrix.

$$Cofs = Ce \times inv(Cr) \tag{V}$$

At step SE5, the search region Wri stored at step SR7 is multiplied with the amount of change Cofs of the container position and posture calculated at step SE4 to obtain the converted search region Wei. The converted search region Wei can be expressed by the following formula (VI).

$$We_i = Cofs \times Wr_i (i=1,2,3,4) \tag{VI}$$

At step SE6, a control signal is output to the 3D measuring device 11, the 3D measuring device 11 is made to measure the 3D points, and the 3D point set is acquired.

At step SE7, it is judged whether the 3D points which belong to the 3D point set would be included in the converted search region when projected on the reference plane along the projection direction, and the set of 3D points judged as being included in the converted search region is determined as the region internal 3D point set. The method for determining the region internal 3D point set will be explained with reference to FIG. 4, FIG. 5, and FIG. 6.

Figure 4:
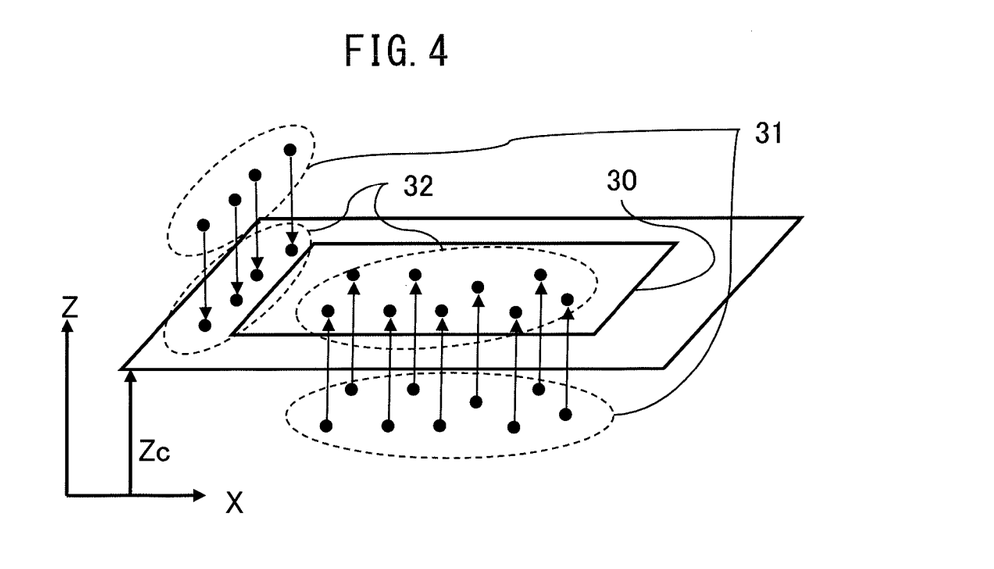
FIG. 4 is a view which schematically shows a 3D point set acquired by the 3D measuring device of FIG. 1.

FIG. 4 is a view which schematically shows a converted search region 30 and 3D point set 31. As shown in FIG. 4, the 3D point set 31 includes both the 3D points which are included in the converted search region 30 when projected on the reference plane along the projection direction (Z-axis direction) and the 3D points which end up outside the region 30. In order to determine the set of the 3D points which are included in the region 30 among these as the region internal 3D point set, first, the projected 3D point set 32 obtained by projecting the 3D point set 31 at the height Zc as the reference plane is determined.

Figure 5:
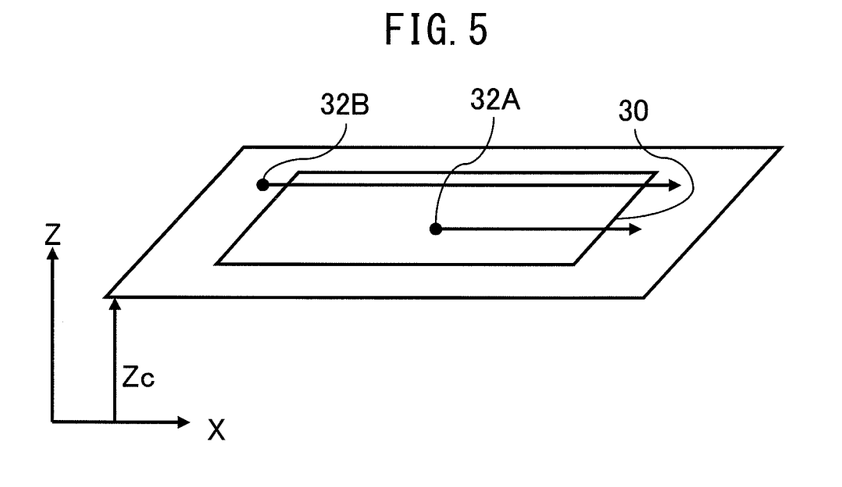
FIG. 5 is a view which explains the processing of FIG. 2B.
Figure 6:
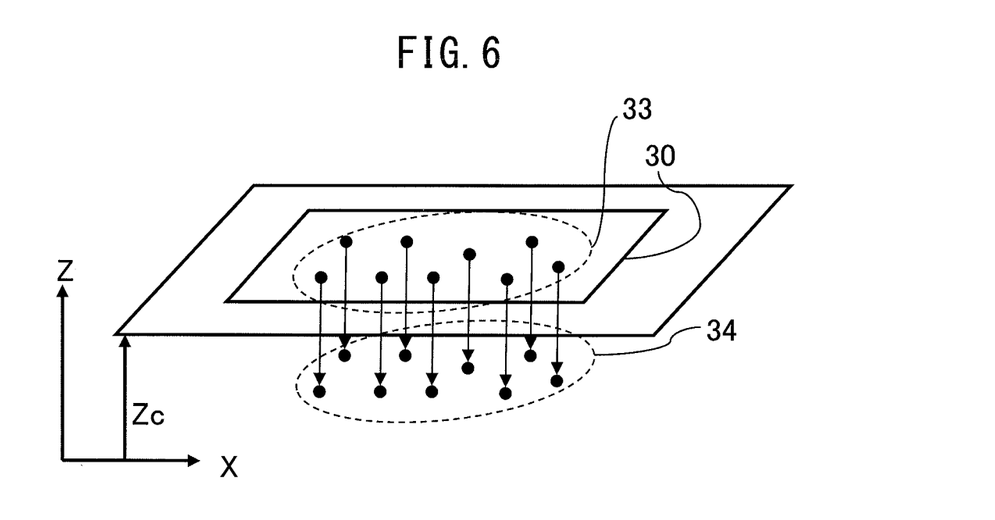
FIG. 6 is another view which explains the processing of FIG. 2B.

Next, it is judged whether the points of the projected 3D point set 32 (below, referred to as a "projected 3D points") are inside the converted search region 30. FIG. 5 is a view for explaining the method of this judgment. FIG. 5 shows a projected 3D point 32A inside of the converted search region 30 and a projected 3D point 32B outside of the converted search region 30. The projected 3D points 32A and 32B are used as starting points to set rays which extend in the positive direction of the x-axis and the number of times of intersection of the rays and the sides of the converted search region 30 are determined. When, like the projected 3D point 32A, a projected 3D point is inside of the converted search region 30, the number of intersections becomes an odd number. When, like the projected 3D point 32B, a projected 3D point is outside of the converted search region 30, the number of intersections becomes zero or an even number. Therefore, by judging whether the number of intersections is an odd number, it is possible to judge whether a projected 3D point is inside the converted search region 30. By executing this processing for all points which are included in the projected 3D point set 32 and collecting all projected 3D points which are judged to be in the converted search region 30, as shown in FIG. 6, it is possible to determine the set of projected 3D points in the converted search region 30 as the region internal 3D point set 33. Next, the 3D points before projection corresponding to the projected 3D points which are included in the region internal 3D point set 33 are collected. This is the region internal 3D point set 34 which is shown in FIG. 6. The positions of the articles 20 are recognized using the region internal 3D point set 34.

At step SE8, the positions of one or more articles 20 are recognized from the region internal 3D point set 34. That is, the article positions are recognized. As the method of recognizing the article positions, there are various methods such as matching using 3D model patterns. A detailed explanation of this point will be omitted.

At step SE9, the recognized article positions are used as the basis to move the robot 13, and articles 20 are gripped and taken out by the hand 15 provided at the robot 13. If a plurality of article positions are recognized, the respective article positions can be used as the basis to take out a plurality of articles 20. By repeating the above steps SE1 to SE9, the work of taking out the articles 20 inside the container 17 is carried out.

Figure 7:
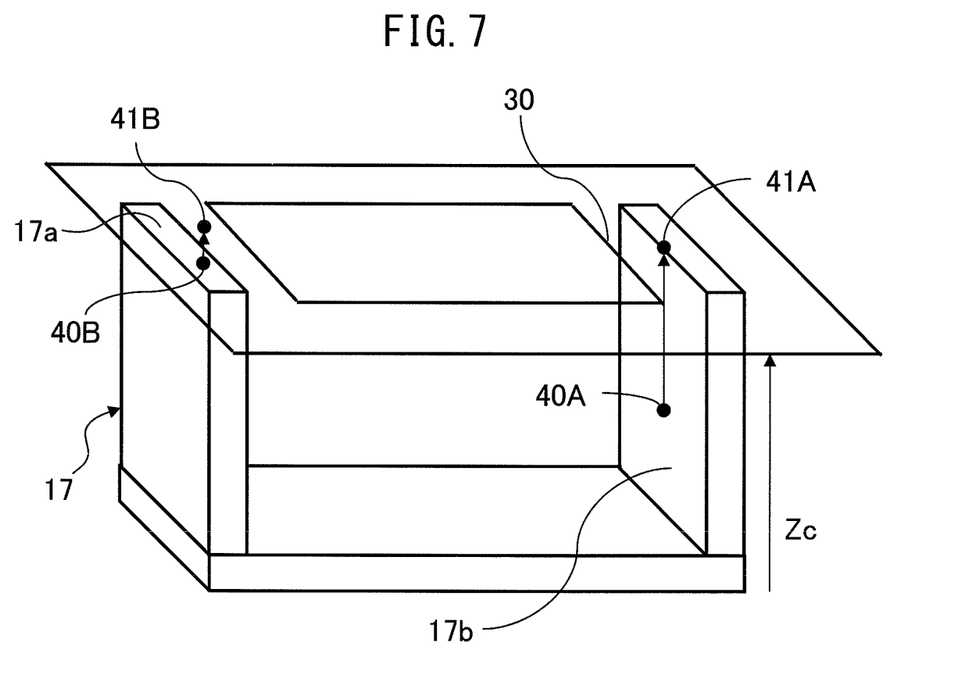
FIG. 7 is a view which explains the advantageous effects of the present embodiment.

FIG. 7 is a view which explains the advantageous effects of the present embodiment. FIG. 7 is illustrated under assumption that the 3D point 40A on the inside wall 71b of the container 17 and the 3D point 40B on the open end face 17a of the container 17 are measured by the 3D measuring device 11 (step SE6). On the reference plane at the height Zc, the converted search region 30 calculated by the above processing (step SE5) is shown. Here, the projected 3D point 41A of the 3D point 40A on the inside wall of the container 17 and the projected 3D point 41B of the 3D point 40B on the open end face are both positioned outside of the region of the converted search region 30 on the reference plane. Therefore, the 3D points 40A and 40B are both not included in the region internal 3D point set 34 (step SE7) and are not used for recognition of the positions of the articles 20. Accordingly, the 3D points of the open end face 17a and the inside wall 17b of the container 17 are not included in the region internal 3D point set 34, and thus it is possible to prevent mistaken recognition of these positions as positions of articles 20.

According to the present embodiment, the following functions and effects can be exhibited:

(1) Due to a imaging operation by the camera 12, a reference container image including the open end face 17a of the container 17 is acquired (step SR1). This reference container image is used as the basis to set an image search region AR (FIG. 3) corresponding to the storage space 17c of the container 17 (step SR6), a reference plane which includes the open end face 17a of the container 17 is set (step SR3), and calibration data of the camera 12 which is stored in advance is used as the basis to calculate a search region on the reference plane which corresponds to the image search region AR (step SR7). Furthermore, the search region is converted to a converted search region 30 (step SE5), a plurality of 3D points which are measured by the 3D measuring device 11 are projected on the reference plane, the 3D points which are included in the converted search region are calculated as the region internal 3D point set 34 (step SE6, step SE7), the region internal 3D point set 34 is used to recognize the positions of articles inside the container (step SE8), and the recognized positions of articles are used as the basis to control the robot 13 to take out the articles (step SE9). Therefore, when the robot 13 takes out articles, it is possible to prevent positions of 3D points of the open end face 17a and the inside walls 17b of the container 17 from being mistakenly recognized as positions of articles 20.

(2) The region which expresses the open end face 17a of the container 17 is specified as the image open end face region IG from the acquired reference container image, and an image search region AR is set inside of the image open end face region IG by predetermined amounts S1, S2. Therefore, it is possible to eliminate relief shapes, etc. of the inside walls 17b from the image search region and possible to accurately recognize articles without being affected by relief shapes of the inside walls 17b.

(3) The image reference container position and posture is specified from the reference container image (step SR2), the calibration data of the camera 12 is used as the basis to calculate the reference container position and posture in actual space corresponding to the image reference container position and posture (step SR5), the image container position and posture is specified from the image of the container 17 at the time of the article take-out work (step SE2), the calibration data of the camera 12 is used as the basis to calculate the container position and posture in actual space corresponding to the image container position and posture (step SE3), and the difference between the reference container position and posture and the container position and posture is used as the basis to convert the search region to the converted search region 30 (step SE5). Due to this, even when the position and posture of the container 17 changes from the reference position and posture, it is possible to accurately recognize positions of articles 20.

(4) Further, the direction of intersection with the reference plane by a set angle is set as the projection direction (step SR4). Due to this, when the plane which a container inside wall 17b forms with respect to the reference plane is not vertical, by setting the projection direction to a direction which is perpendicular to the normal vector of the plane formed by the inside wall 17b of the container and which gives the largest internal product with the normal vector of the reference plane, it is possible to prevent mistaken recognition of positions of 3D points of the inside wall 17b as positions of articles 20.

In the above embodiment, although a predetermined search region in actual space is converted to the converted search region 30 at the time of taking out an article, when the amount of change of the position and posture of the container 17 is small (for example, when the amount of change of the position and posture is 0), it is also possible to use the search region instead of the converted search region 30 to acquire the region internal 3D point set 34. In the above embodiment, although the image search region AR is configured by a square shape, it may also be configured by another polygonal shape.

Figure 8:
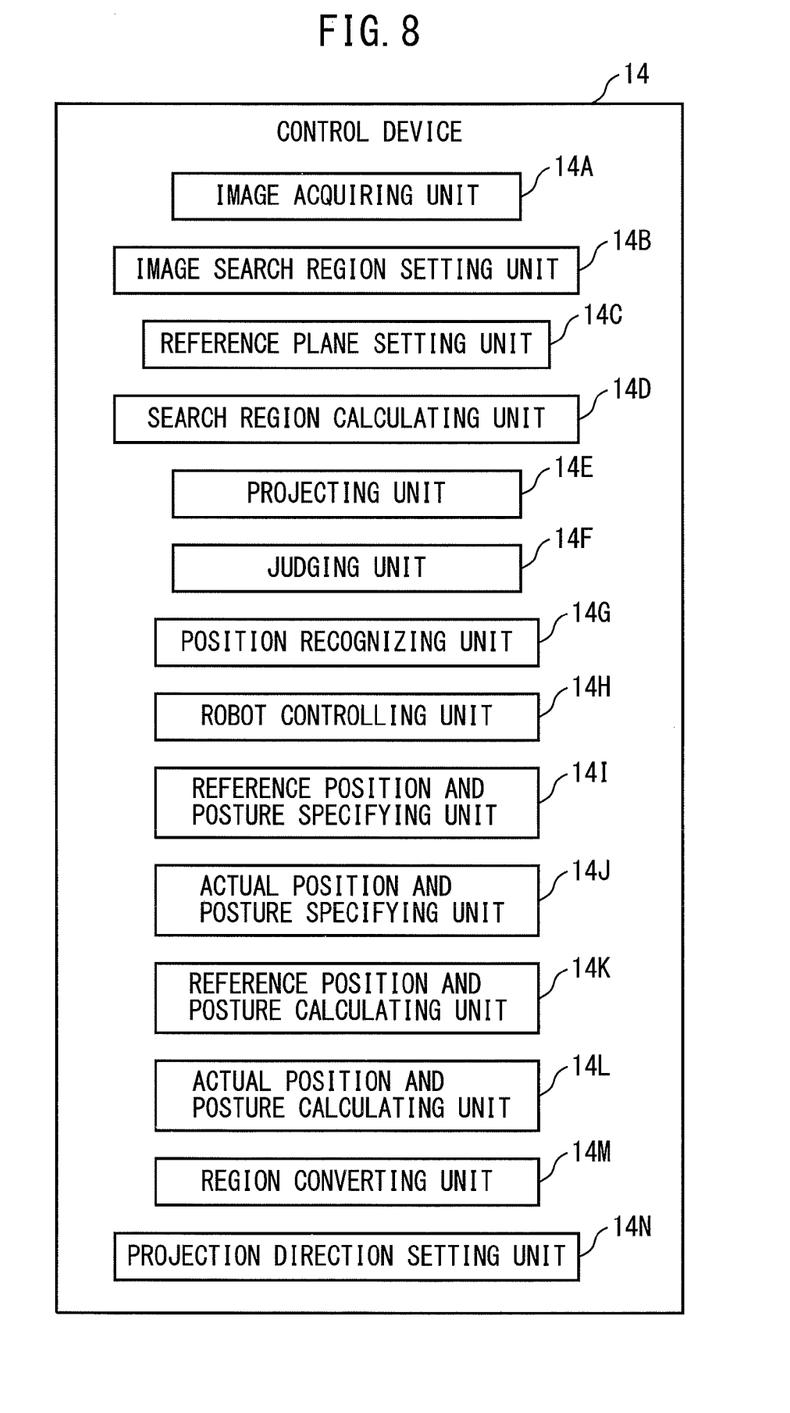
FIG. 8 is a block diagram which shows a configuration inside the control device of FIG. 1.

FIG. 8 is a block diagram which shows a configuration inside the control device of FIG. 1. The control device 14 in the above embodiment includes, as functional configurations, an image acquiring unit 14A which acquires an image of the container 17 imaged by the camera 12 (step SR1, step SE1), an image search region setting unit 14B which sets an image search region AR based on the acquired image (step SR6), a reference plane setting unit 14C which sets a reference plane of the container 17 (step SR3), a search region calculating unit 14D which calculate a search region based on the calibration data of the camera 12 stored in advance (step SR7), a projecting unit 14E which projects the plurality of 3D points measured by the 3D measuring device 11 on the reference plane (step SE7), a judging unit 14F which judges whether the plurality of 3D points which are projected are included in the search region (step SE7), a position recognizing unit 14G which recognizes the positions of the articles 20 inside the container by using the 3D points judged to be included in the search region among the plurality of 3D points measured by the 3D measuring device 11 (step SE8), and a robot controlling unit 14H which controls the robot 13 so as to take out an article 20 based on recognized positions of articles 20 (step SE9).

Furthermore, the control device 14 includes a reference position and posture specifying unit 14I which specifies an image reference container position and posture from a reference container image (step SR2), an actual position and posture specifying unit 14J which specifies an image actual container position and posture from an actual container image (step SE2), a reference position and posture calculating unit 14K which calculates a reference container position and posture based on the calibration data of the camera 12 (step SR5), an actual position and posture calculating unit 14L which calculates an actual container position and posture based on the calibration data of the camera 12 (step SE3), a region converting unit 14M which converts the search region to the converted search region 30 based on the difference between the calculated reference container position and posture and the actual container position and posture (step SE5), and a projection direction setting unit 14N which sets a projection direction of 3D points by the projecting unit (step SR4).

According to the present invention, a search region is set on the plane which includes the open end face of the container using the image from the camera, and the points included in the search region among the 3D points of the surfaces of articles measured by the 3D measuring device are used as the basis to recognize the positions of the articles. Due to this, it is possible to prevent mistaken recognition of the open end face and inside walls of the container as articles and possible to use the hand of a robot to precisely take out an article.

Above, while the present invention has been explained with reference to preferred embodiments, a person skilled in the art would understand that various changes and modifications may be made without departing from the scope of the appended claims.

The invention claimed is:

1. An article take-out apparatus comprising:
    a 3D measuring device measuring surface positions of a plurality of articles stored in bulk in a storage space of a container, the container having a planar shaped open end face and inside wall parts, the inside wall parts being connected to the open end face and forming the storage space;
    a camera taking an image of a region including the open end face of the container;
    a robot having a hand capable of taking out an article from inside the container;
    an image acquiring unit acquiring an image of the container taken by the camera;
    an image search region setting unit setting a region on the image corresponding to the storage space as an image search region, based on the image acquired by the image acquiring unit;
    a reference plane setting unit setting a plane including the open end face of the container as a reference plane;
    a search region calculating unit calculating a region on the reference plane corresponding to the image search region as a search region, based on calibration data of the camera stored in advance;
    a projecting unit projecting a plurality of 3D points measured by the 3D measuring device on the reference plane;
    a judging unit judging whether the plurality of 3D points projected by the projecting unit are included in the search region;
    a position recognizing unit recognizing a position of an article inside the container by using the 3D points judged by the judging unit to be included in the search region among the plurality of 3D points measured by the 3D measuring device; and
    a robot controlling unit controlling the robot so as to take out the article, based on the position of the article recognized by the position recognizing unit.

2. The article take-out apparatus according to claim 1, wherein
    the image search region setting unit specifies a region expressing the open end face of the container as an image open end face region, from a reference container image acquired by the image acquiring unit as an image of the container in a reference state at which the container is set at a reference position and posture, and sets the image search region inside the image open end face region by a predetermined amount.

3. The article take-out apparatus according to claim 2, wherein the image acquiring unit acquires the reference container image and acquires an image of the container in an actual state where a position and posture of the container changes from the reference state as an actual container image, the image search region setting unit setting the image search region based on the reference container image, the apparatus further comprises:

a reference position and posture specifying unit specifying an image reference container position and posture which expresses a position and posture of the container on an image from the reference container image;

an actual position and posture specifying unit specifying an image actual container position and posture which expresses a position and posture of the container on the image from the actual container image;

a reference position and posture calculating unit calculating a position and posture of the container in an actual space corresponding to the image reference container position and posture as a reference container position and posture, based on the calibration data of the camera;

an actual position and posture calculating unit calculating a position and posture of the container in the actual space corresponding to the image actual container position and posture as an actual container position and posture, based on the calibration data of the camera; and a region converting unit converting the search region calculated by the search region calculating unit to a converted search region, based on a difference between the reference container position and posture calculated by the reference position and posture calculating unit and the actual container position and posture calculated by the actual position and posture calculating unit, and wherein the judging unit judges whether the plurality of 3D points projected by the projecting unit are included in the converted search region converted by the region converting unit.

4. The article take-out apparatus according to claim 1, wherein the image acquiring unit acquires an image of the container in a reference state at which the container is set at a reference position and posture as a reference container image and acquires an image of the container in an actual state where a position and posture of the container changes from the reference state as an actual container image, the image search region setting unit setting the image search region based on the reference container image, the apparatus further comprises:

a reference position and posture specifying unit specifying an image reference container position and posture which expresses a position and posture of the container on an image from the reference container image;

an actual position and posture specifying unit specifying an image actual container position and posture which expresses a position and posture of the container on the image from the actual container image;

a reference position and posture calculating unit calculating a position and posture of the container in an actual space corresponding to the image reference container position and posture as a reference container position and posture, based on the calibration data of the camera;

an actual position and posture calculating unit calculating a position and posture of the container in the actual space corresponding to the image actual container position and posture as an actual container position and posture, based on the calibration data of the camera; and a region converting unit converting the search region calculated by the search region calculating unit to a converted search region, based on a difference between the reference container position and posture calculated by the reference position and posture calculating unit and the actual container position and posture calculated by the actual position and posture calculating unit, and wherein the judging unit judges whether the plurality of 3D points projected by the projecting unit are included in the converted search region converted by the region converting unit.

5. The article take-out apparatus according to claim 1, further comprising a projection direction setting unit setting a projection direction of the 3D points by the projecting unit.

6. The article take-out apparatus according to claim 1, wherein the image search region set by the image search region setting unit is polygonal in shape.

7. The article take-out apparatus according to claim 1, wherein the 3D measuring device has the camera.

* * * * *